(12) United States Patent
Zondiner

(10) Patent No.: US 11,273,651 B2
(45) Date of Patent: Mar. 15, 2022

(54) SUCTION DEVICE

(71) Applicant: HP SCITEX LTD., Netanya (IL)

(72) Inventor: Ehud Zondiner, Netanya (IL)

(73) Assignee: HP SCITEX LTD., Netanya (IL)

( * ) Notice: Subject to any disclaimer, the term of this patent is extended or adjusted under 35 U.S.C. 154(b) by 0 days.

(21) Appl. No.: 17/151,517

(22) Filed: Jan. 18, 2021

(65) Prior Publication Data

US 2021/0162780 A1 Jun. 3, 2021

Related U.S. Application Data

(62) Division of application No. 16/539,013, filed on Aug. 13, 2019, now Pat. No. 10,906,335.

(30) Foreign Application Priority Data

Aug. 23, 2018 (EP) .................................... 18190583

(51) Int. Cl.
*B41J 11/00* (2006.01)
*B41J 13/22* (2006.01)
*B25J 15/06* (2006.01)

(52) U.S. Cl.
CPC ....... *B41J 11/0085* (2013.01); *B25J 15/0616* (2013.01); *B41J 13/226* (2013.01); *B65H 2406/351* (2013.01); *B65H 2406/3632* (2013.01)

(58) Field of Classification Search
CPC .. B41J 11/0085; B41J 13/226; B41J 13/0072; B25J 15/0616; B65H 2406/351; B65H 2406/3632; B25B 11/005
See application file for complete search history.

(56) References Cited

U.S. PATENT DOCUMENTS

| | | |
|---|---|---|
| 3,460,822 A | 8/1969 | Link |
| 3,720,433 A | 3/1973 | Rosfelder |
| 6,092,894 A | 7/2000 | Nuita et al. |
| 6,254,092 B1 | 7/2001 | Yraceburu et al. |
| 6,357,869 B1 | 3/2002 | Rasmussen et al. |
| 6,371,430 B1 | 4/2002 | Vernackt |
| 8,033,624 B2 | 10/2011 | Silva et al. |
| 8,042,799 B2 | 10/2011 | Clark |
| 8,066,368 B2 | 11/2011 | Maekawa et al. |
| 9,290,018 B1 | 3/2016 | Vandagriff et al. |
| 9,427,986 B2 | 8/2016 | Furukawa |
| 2006/0261536 A1 | 11/2006 | Dangelewicz et al. |
| 2009/0103966 A1* | 4/2009 | Hoy .................... B65H 18/28 400/619 |

(Continued)

FOREIGN PATENT DOCUMENTS

WO WO-2018074987 A1 4/2018

*Primary Examiner* — Lamson D Nguyen
(74) *Attorney, Agent, or Firm* — Dierker & Kavanaugh PC

(57) ABSTRACT

According to examples, there is provided a suction device, system and method for retaining media on a surface. The suction device comprising a suction cup having a vacuum port for coupling the suction cup to a vacuum source, a sealing piston configured to seal the vacuum port when the sealing piston is in a first position, wherein when the sealing piston is in a second, depressed, position the vacuum source is coupled to the suction cup the sealing piston further comprising a piston head extending above a rim of the suction cup when the sealing piston is in the first position, and a biasing element to bias the sealing piston to the first position.

11 Claims, 4 Drawing Sheets

(56) References Cited

U.S. PATENT DOCUMENTS

| | | |
|---|---|---|
| 2010/0239408 A1 | 9/2010 | Becker et al. |
| 2012/0193500 A1 | 8/2012 | Kniss et al. |
| 2014/0240423 A1 | 8/2014 | Cressman et al. |
| 2016/0258472 A1 | 9/2016 | Perlman et al. |

\* cited by examiner

SUCTION DEVICE

CROSS REFERENCE TO RELATED APPLICATIONS

This is a divisional of U.S. application Ser. No. 16/539,013 filed Aug. 13, 2019 which claims priority to EP application no. 18190583.7 filed Aug. 23, 2018.

BACKGROUND

In some media handling apparatus, such as printers, media stackers or the like, media conveyors such as belt-type conveyors, rollers or pallets on an endless track may be used to convey media, for example print media onto which text or an image may be printed. For example, such media conveyors may be used to convey media from a media storage area to a position in which it can be printed (for example, near a printhead of the printer of the like) and then to convey the printed media to a curing and/or collection area.

BRIEF INTRODUCTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
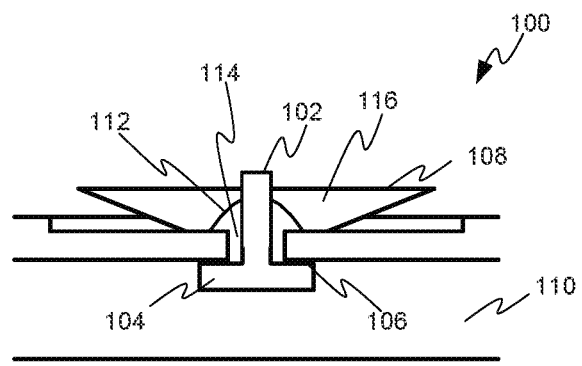
FIG. 1 shows a suction device according to an example of the disclosure.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Media conveyors may be used to move media, for example a sheet media such as paper, card stock, and the like. For example, a media conveyor may be provided in a print apparatus to transport a print medium through the print apparatus when printing an image to the print medium.

In order to securely hold the sheet media to the media conveyor, suction may be used. For example, the media conveyor may include a vacuum table or belt that is perforated to allow suction of air from an upper surface to a vacuum chamber located underneath.

In such arrangements, the vacuum force applied to a medium on the media conveyor is equal to the total vacuum hole area of the perforations multiplied by the vacuum pressure. In order to increase the vacuum force, the perforations may be enlarged to increase the vacuum hole area. However, as some holes may often be left uncovered by the medium, enlarging the vacuum holes may lead to significantly reduced vacuum pressure in the vacuum chamber, which may lead to a more powerful vacuum source being specified and may result in increased energy costs.

In order to ensure that a sufficient vacuum force is efficiently applied to a medium, a user may limit the sheet media used to a size which covers all of the vacuum holes on the surface of the media conveyor, or may attempt to manually cover the unused vacuum holes, for example using tape. A further approach may be to provide a zoned media conveyor in which the vacuum holes are split into sections associated with different vacuum chambers/sources. Selection of a subset of zones may then allow the provided suction to be tailored to a particular substrate size. However, these approaches are generally time consuming, inflexible and may use a high vacuum level to be provided to compensate for losses in the system.

To provide an increased holding force without increasing the size of the vacuum holes, a suction cup arrangement has been developed, whereby each vacuum hole is associated with a larger suction cup that contacts the sheet medium. By applying the vacuum pressure over a larger area of the sheet media inside the circumference of the suction cup, the holding force associated with each suction hole is increased for a same vacuum pressure, while the size of the vacuum hole itself can be maintained.

However, the vacuum hole associated with suction cups that are not covered by a sheet medium in operation will still lead to pressure losses and reduce the efficiency of the media conveyor.

Certain examples described herein provide methods and apparatus for selectively coupling a vacuum source to a suction cup in the presence of a medium to provide a holding force to secure the medium in place while avoiding inefficiencies associated with vacuum losses though uncovered vacuum holes. For example, according to some examples, there is provided a self-activating suction cup that automatically seals a vacuum hole in the absence or a sheet medium covering the suction cup, and then when a sheet medium is brought into contact with a rim of the suction cup opens the vacuum hole to allow fluid communication with a source of vacuum pressure.

FIG. 1 illustrates a suction device 100 according to an example of the disclosure. The suction device 100 includes a vacuum hole 114 to allow fluid communication between a top surface of the suction device 100 and a source of vacuum pressure, such as a vacuum chamber 110. A suction cup 116 having a rim 108 is positioned on the top surface of the suction device and is associated with the vacuum hole 114. A sealing piston 104 is located within the vacuum hole and comprises a piston head 102 that extends above the rim 108 of the suction cup. A spring element 112 is coupled to the sealing piston 104 and biases the sealing piston 104 against a sealing area 106 located around the vacuum hole to isolate the suction cup 116 from the vacuum chamber 110. The sealing piston 104 may be provided with a sealing surface arranged to engage with the sealing area 106 in a closed position.

Figure 2:
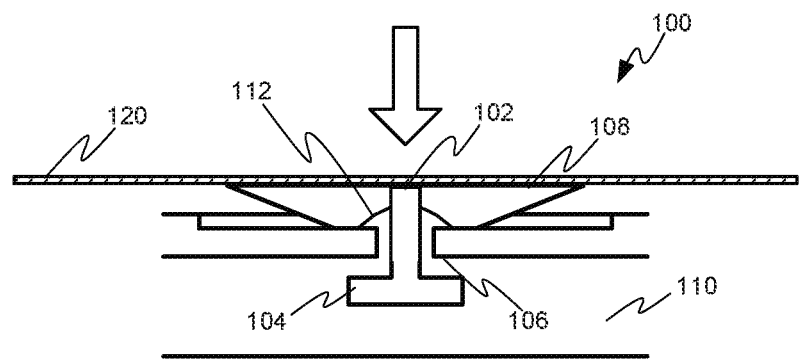
FIG. 2 shows a substrate contacting the suction device of FIG. 1 according to an example of the disclosure.

FIG. 2 illustrates the suction device 100 when a substrate 120, such as a print medium, is brought into contact with the rim 108 of the suction cup 116. When the sealing piston 104 is in the closed position, the piston head 102 extends above the rim 108 of the suction cup 116. Therefore, as the substrate 120 comes into contact with the rim 108, it also engages the piston head 102 and depresses the sealing piston 104 into an open position. As the sealing piston 104 moves into the open position, the suction cup comes into fluid communication with the vacuum chamber 110 and the vacuum pressure is applied within the suction cup. This results in a suction force being applied to the medium by the suction cup 116 that has a magnitude determined by the vacuum pressure acting over the area within the rim 108 of the suction cup 116 in contact with the print medium 120.

The spring element 112 is selected to provide a biasing force ($f_s$) that is greater than the vacuum force ($f_v$) generated in operation by the vacuum pressure (V) in the vacuum chamber 110 acting on the area (a) of the sealing piston 104. This means that the spring element 112 provides sufficient force to maintain the sealing piston 104 in a closed position when the vacuum pressure is applied to the vacuum chamber 110 i.e, for:

$$f_v = V \times a;$$

$$f_s > f_v$$

Furthermore, the biasing force (fs) of the spring element 112 may be selected to be less than the force (F) applied to the print medium by the vacuum pressure (V) acting over the area (A) within the rim 108 of the suction cup 116 in contact with the print medium 120, i.e. for:

$$F = V \times A;$$

$$F > f_s$$

Thus, once the substrate 120 has been brought into contact with the rim 108 of the suction cup 116, and the vacuum pressure of the vacuum chamber 110 has been coupled to the interior of the suction cup 116, the force applied to the substrate 120 is sufficient to overcome the biasing force of the spring element 112 and thereby maintain the sealing piston 104 in the open position.

Figure 3:
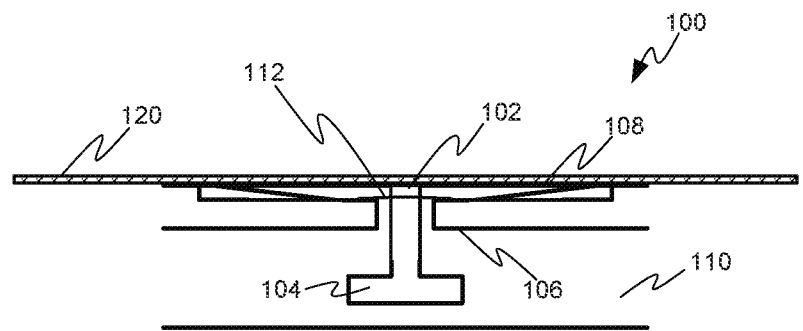
FIG. 3 shows a suction device fully engaged with a substrate according to an example of the disclosure.

FIG. 3 illustrates the suction device 100 in a further configuration in which the suction cup 116 is compressed level with a top surface of a support substrate to provide a retaining force to the substrate 120 while holding the substrate 120 flat. For example, suction cup may be fabricated from an elastically deformable material such that the suction force (F) applied to the substrate in the configuration of the suction device 100 illustrated in FIG. 2 is sufficient to deform the suction cup 116 walls into recesses in the top surface of the support substrate to provide the level surface.

When it is desired to release the substrate 120 from the suction cup the vacuum pressure may be reduced, for example by switching off or isolating a vacuum source from the vacuum chamber 110. The biasing force provided by the spring element 112 may then raise the substrate 120 above the rim 108 of the suction cup 116, biasing the sealing piston 104 against the sealing surface 106 and isolating the suction cup 116 from the vacuum chamber 110.

Figure 4A:
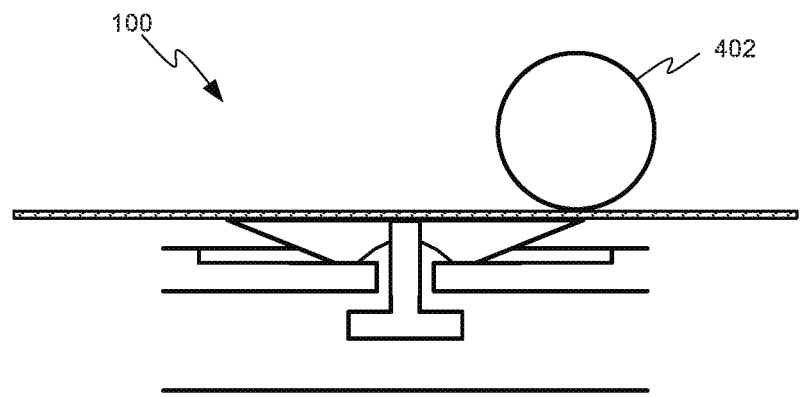
FIG. 4a-4c shows example positioning devices for positioning a substrate on a suction device according to an example of the disclosure.
Figure 4B:
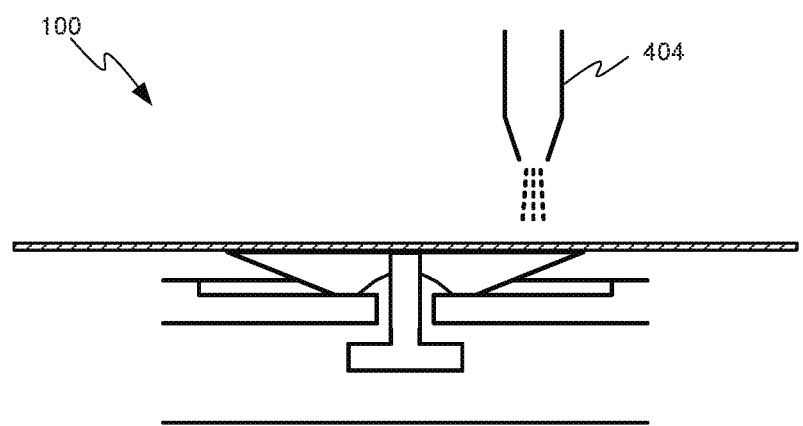
Figure 4C:
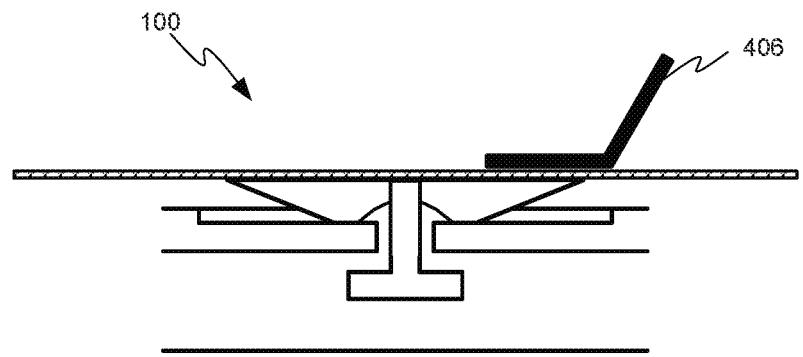

In order to bring the substrate 114 into contact with the rim 108 of the suction cup 116, and overcome the biasing force applied to the sealing piston 104 by the spring element 112, a positioning device may be provided. FIGS. 4a to 4c illustrate a number of example positioning devices that could be used. FIG. 4a illustrates the use of a roller 402 to press the substrate 114 against the suction cup 116; FIG. 4b illustrates the use of air jet device 404; and FIG. 4c illustrates an inlet bracket 406.

Spring element 112 may be implemented as any suitable element capable of providing the desired biasing force. For example, the spring element 112 may take the form of a leaf/wire mechanism, a spiral spring mechanism, an integral elastic element mechanism, an elastic cylinder mechanism, or any other suitable mechanism.

Figure 5:
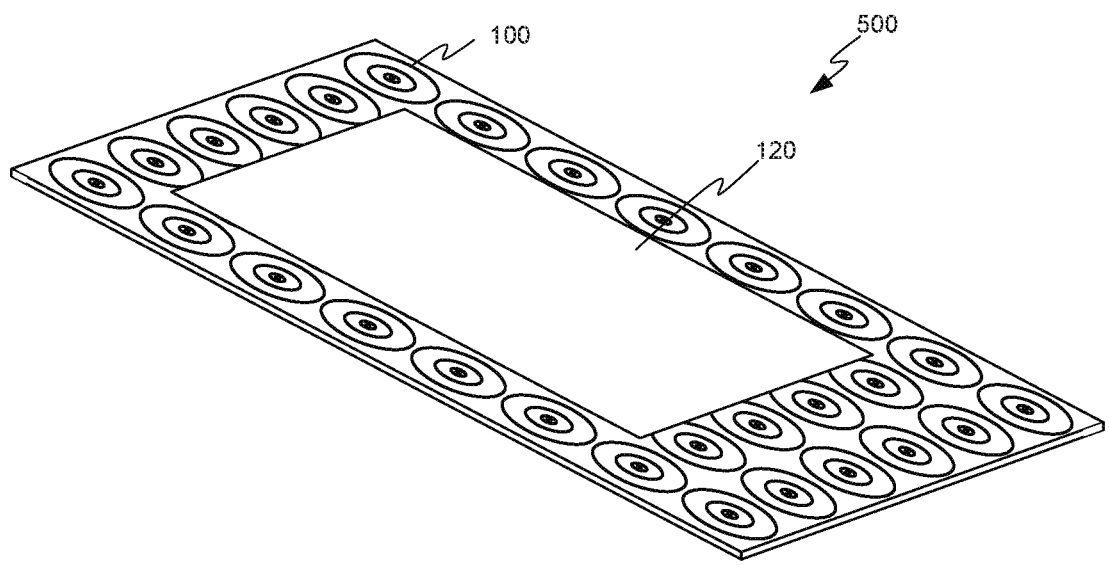
FIG. 5 shows a media support platform including a plurality of suction devices according to an example of the disclosure.

FIG. 5 illustrates a media conveyor 500, or media support platform, including a plurality of suction devices 100 according to the above described examples. The media conveyor 500 may include a vacuum chamber underlying the plurality of suction devices 100 that can be selectively coupled to the suction cups of the plurality of suction devices in the presence of a substrate 114 as described above. In some examples, the media support platform 500 may be a vacuum table or a vacuum belt.

As shown in FIG. 5, a substrate 120 may cover a subset of the plurality of suction devices 100 on the surface of the media conveyor 500. Suction devices 100 covered by the substrate 120 will automatically be activated by the action of the substrate 120 pressing down on the piston head 102 of each suction device 100. In contrast, the sealing pistons of the uncovered suction devices will remain in the closed position, isolating the associated suction cups from the vacuum source.

Thus, the example media conveyor 500 of FIG. 5 is operable to automatically enable the suction devices 100 to provide a suction force to any size of substrate 120, or print media, while avoiding vacuum losses by sealing uncovered vacuum holes.

Figure 6:
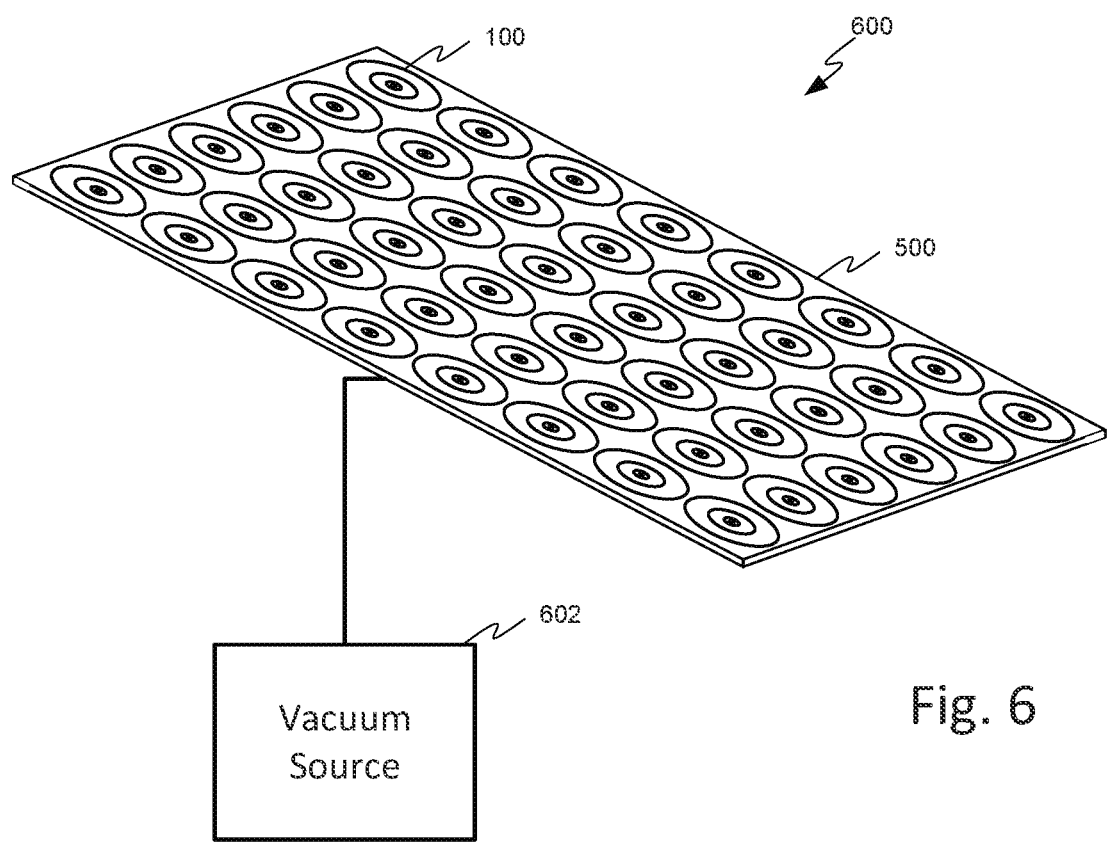
FIG. 6 shows a system including the media support platform of FIG. 5 according to an example of the disclosure.

FIG. 6 illustrates a system 600 according to some examples, such a print apparatus, incorporating the media conveyor 500 of FIG. 5. The system of FIG. 6 further includes a vacuum source 602, such as a pump device, in fluid communication with the vacuum chamber of the media conveyor 500 to provide the vacuum pressure in operation.

System 600 may further include a positioning device, such as illustrated in FIGS. 4a to 4c to position the substrate 120 on the media support platform in contact with a rim 108 of at least one suction cup 116, so as to cause the sealing piston 104 associated with that suction cup 116 to be depressed, coupling the vacuum chamber to the suction cup.

Figure 7:
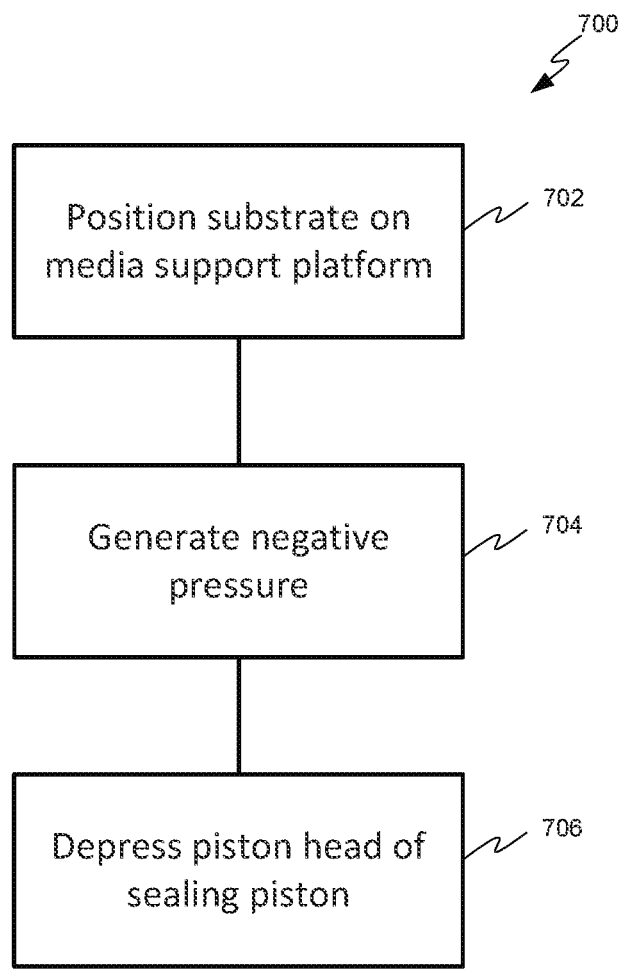
FIG. 7 shows a method according to an example of the disclosure.

FIG. 7 illustrates a method 700 according to some examples of the disclosure. According to the method 700 of FIG. 7, a substrate 120, such as a print medium, is positioned 702 on a media support platform 500, such as described above, in contact with a rim of a suction device 100 of the media support platform 500. A negative pressure, or vacuum, is then generated 704, for example using a vacuum pump, and communicated to a vacuum chamber of the media support platform 500. In response to the presence of the substrate on the media support platform 500, a piston head 102 of a sealing piston 104 of the suction device 100 is depressed, moving the sealing piston 104 to an open position and causing the generated negative pressure to be communicated to the interior of the suction cup 116 to hold the substrate 120 in position on the media support belt.

Generally, for example as illustrated in FIG. 5, the substrate 120 will come into contact with multiple suction devices 100 of the media support platform 500, and therefore a subset of the plurality of suction devices comprising two or more will be activated as described above.

The positioning of the substrate 120 may involve a positioning device configured to apply a force to the surface of the substrate 120 to cause the substrate to engage at least one piston head 102 of a sealing piston 104 associated with the suction device 100 of the media support platform 500. In particular, the applied force may be of sufficient magnitude to cause the sealing piston to be depressed against the action of a biasing element 112 or spring that is operable to hold the sealing piston in a closed position under normal conditions.

Once the substrate 120 is securely held on the media support platform 500, it may then be conveyed into a desired position, for example through a printing process, while retained in position on the platform.

All of the features disclosed in this specification (including any accompanying claims, abstract, and drawings) may be combined in any combination, except combinations where some of such features are mutually exclusive. Each feature disclosed in this specification, including any accompanying claims, abstract, and drawings), may be replaced by alternative features serving the same, equivalent, or similar purpose, unless expressly stated otherwise. Thus, unless expressly stated otherwise, each feature disclosed is one example of a generic series of equivalent or similar features.

The present teachings are not restricted to the details of any foregoing examples. Any novel combination of the features disclosed in this specification (including any accompanying claims, abstract, and drawings) may be envisaged. The claims should not be construed to cover merely the foregoing examples, but also any variants which fall within the scope of the claims.

The invention claimed is:

1. A method of retaining media on a media support platform, the method comprising:
    positioning a substrate on the media support platform, the media support platform comprising a plurality of suction devices, the substrate positioned to contact a rim of a suction cup associated with at least one of the plurality of suction devices;
    generating a negative pressure;
    depressing a piston head of a sealing piston associated with the at least one suction device, the sealing piston arranged to isolate the suction cup of the at least one suction device from the negative pressure in a first position and to communicate the negative pressure to the at least one suction cup of the suction device in a second position;
    wherein depressing the piston head causes the sealing piston to move to the second position against the action of a biasing element, the biasing element to bias the sealing piston to the first position; and
    wherein positioning the substrate on the media support platform causes the piston head to be depressed.

2. The method of claim 1, wherein positioning the substrate further comprises positioning the substrate to cover a subset of the plurality of suction devices, and wherein uncovered suction devices are isolated from the vacuum source by the associated sealing pistons.

3. The method of claim 1, further comprising:
    configuring the biasing element to have a biasing force greater than a first vacuum force exerted on the sealing piston by the vacuum source but less than a second vacuum force exerted on the substrate in contact with the rim of the suction cup when the sealing piston is in the second position.

4. The method of claim 1, the method further comprising:
    conveying the substrate while retained in position on the media support platform.

5. A method of retaining sheet media on a media support platform having multiple suction cups and multiple vacuum holes each associated with a corresponding suction cup, the method comprising automatically opening a closed one of the vacuum holes when a sheet is pressed against the corresponding suction cup, to connect the vacuum hole to a vacuum source.

6. The method of claim 5, comprising automatically closing an open one of the vacuum holes when a sheet pressed against the corresponding suction cup is released, to disconnect the vacuum hole from the vacuum source.

7. The method of claim 5, wherein automatically opening a closed one of the vacuum holes when a sheet is pressed against the corresponding suction cup to connect the vacuum hole to a vacuum source comprises automatically opening multiple closed ones of the vacuum holes when a sheet is pressed against the corresponding suction cups, to connect the vacuum holes to the vacuum source.

8. The method of claim 7, comprising automatically closing multiple open ones of the vacuum holes when a sheet pressed against the corresponding suction cups is released, to disconnect the vacuum holes from the vacuum source.

9. A sheet media support system, comprising:
    a vacuum source; and
    a platform to support sheet media, the platform including multiple vacuum holes connected to the vacuum source and multiple self-activating suction devices each surrounding a corresponding vacuum hole and configured to automatically open the vacuum hole when a sheet is pressed against the suction device and to automatically open the vacuum hole when a sheet pressed against the suction device is released.

10. The system of claim 9, wherein each suction device comprises:
    a suction cup surrounding a corresponding vacuum hole; and
    a piston movable, when a sheet is pressed against the suction device, from a first position in which the vacuum hole is closed to a second position in which the vacuum hole is open.

11. The system of claim 10, wherein each suction device comprises a biasing element to bias the piston toward the first position.

* * * * *